July 15, 1924.

T. MIDGLEY, JR 1,501,567

JOINING METALS

Filed Jan. 29, 1920

Witnesses
Warren Schmieding

Inventor
Thomas Midgley Jr.
By Kerr, Page, Cooper and Hayward
Attorneys

Patented July 15, 1924.

1,501,567

UNITED STATES PATENT OFFICE.

THOMAS MIDGLEY, JR., OF DAYTON, OHIO, ASSIGNOR, BY MESNE ASSIGNMENTS, TO GENERAL MOTORS RESEARCH CORPORATION, OF DAYTON, OHIO, A CORPORATION OF DELAWARE.

JOINING METALS.

Application filed January 29, 1920. Serial No. 354,770.

*To all whom it may concern:*

Be it known that I, THOMAS MIDGLEY, Jr., a citizen of the United States of America, residing at Dayton, county of Montgomery, State of Ohio, have invented certain new and useful Improvements in Joining Metals, of which the following is a full, clear, and exact description.

This invention relates to the joining together of metals, and one object of the invention is to provide for joining together metals, which may not be readily and satisfactorily joined by the usual methods, in such wise that a substantially uniform bond is secured between them.

Another object of the invention is to provide a method of attaching cooling elements, such as copper fins, to an engine cylinder, so that effective thermal conductivity across the bond of the cylinder and cooling elements is secured.

Other objects and advantages of the present invention will be apparent from the description set out below, when taken in connection with the accompanying drawing, in which, Fig. 1 is a view showing the first step in the preparation of apparatus for effecting the joining of copper fins to a cylinder which consists in forming a core, containing the fins;

While this invention is generally applicable to the joining of a plurality of metals to secure a good bond between them, it has been worked out primarily in connection with the attachment of cooling elements, or fins, to an engine cylinder and for purposes of easier description, the joining of copper fins to a steel or cast iron engine cylinder is set out. It is to be understood, however, that the invention is by no means limited to this specific adaptation. In the joining of copper fins to a cylinder the fins are arranged in their proper positions, being embedded within a core or otherwise protected except as to those parts which are to be actually joined to the cylinder, the cylinder is placed within the fins, in properly spaced relation thereto, and soldering material is then run around the unprotected ends of the fins, and a joining of the fins to the cylinder thus secured.

Figure 5:
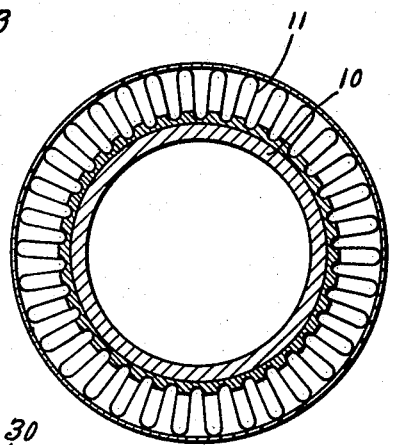
Fig. 5 is a sectional view of a completed cylinder after the joining operation has taken place.

An engine cylinder of the type shown in Fig. 5 comprises a cylinder portion 10 to which is attached a plurality of fins 11. In the cylinder disclosed these fins are of copper, or some other metal of good thermal conductivity, and are made up from, comparatively, thin sheet copper. For purposes of easier manufacture the fins are preferably made from a continuous sheet of copper which is bent upon itself, or corrugated, as shown; but, if desired, they may be made separately, instead of in one piece. The method of joining them to the cylinder is fundamentally the same, in each case however.

Figure 1:
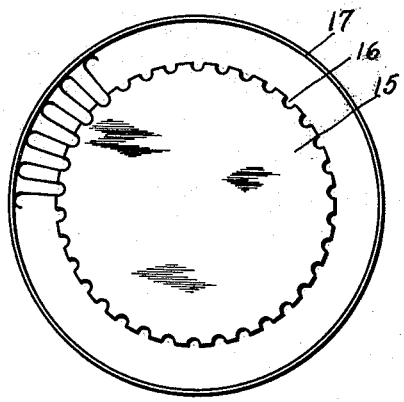
Figure 2:
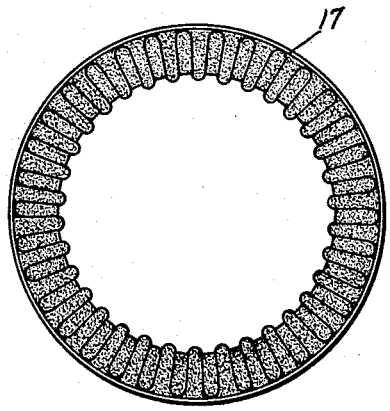
Fig. 2 shows a completed core.
Figure 3:
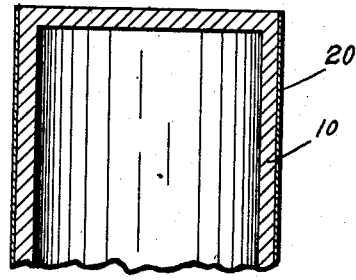
Fig. 3 is a sectional view of an engine cylinder, coated with soldering material, ready for the joining operation.
Figure 4:
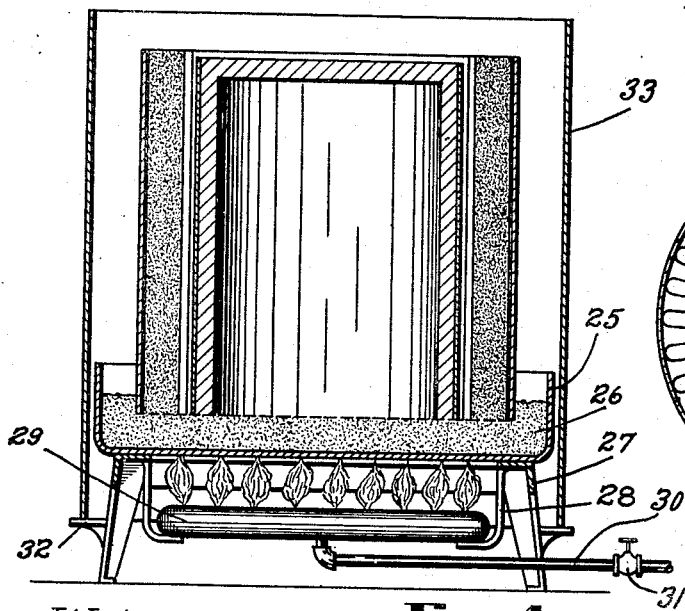
Fig. 4 is a sectional view of the apparatus in which the joining of the two metals is accomplished, showing the coated cylinder and core, containing the cooling elements, in properly assembled relation for accomplishing the joining thereof.

In carrying this method into effect the fins are positioned about a former 15 which is preferably made of a metal such as aluminum. However, it may, of course, be made of any other desired metal. This former is provided in the periphery thereof with slots or grooves, 16, adapted to receive the inner ends of the fins when they are assembled about the former. As shown in the drawing, the former is adapted for vertically arranged fins and consequently the slots 16 are arranged longitudinally thereof. The fins having been assembled, and properly arranged in the slots 16, a metal tube 17 is arranged about them. This tube is made of the proper diameter to just snugly enclose the fins when they are assembled upon the former. If desired the tube 17 may have clamping elements associated therewith adapted to hold the fins snugly against the former. The space between the former and the tube, and around the fins is next filled with some refractory material, such as core sand. Any other desired material may be used, but it has been found that core sand functions very satisfactorily. This sand is tamped down firmly into place, so as to form in effect a core, within the tube 17, in which the greater part of the fins is embedded. As is obvious from the drawing so much of the fins as is positioned within the grooves or slots 16 is not covered by the sand. The completed core is shown in Fig. 2, in which the parts of the fins arranged within the slots are shown extending into the space within the core.

Prior to the actual joining operation, and in order to insure more satisfactory bonding of the fins to the cylinder, the cylinder, 10, is coated with a layer of material 20, which will tend to facilitate such bonding. This material should be varied according to the type of soldering material used. Where a lead-tin solder is used, the coating will preferably be of lead or of the lead tin solder. Tin alone will also function satisfactorily with such a solder.

The core and cylinder having been properly prepared are placed in a pan or trough 25. The former 15 should be so proportioned that the core containing the fins will be adapted to freely receive the coated cylinder within the space defined by the inner ends of the fins, the cylinder and core when assembled being so arranged that a space is left between the cylinder and the core for receiving soldering material. In order to securely close up the lower end of this space and prevent the solder from running therefrom before it has had an opportunity to cool and set, the pan 25 is filled with a material 26, adapted to securely dam up the lower end of the space. A number of materials could no doubt be used but it has been found that a paste consisting of whiting mixed with water glass functions very satisfactorily indeed. A mixture of borax and sand has been found to function satisfactorily in this relation, but the whiting and water glass mixture is thought preferable. The pan is adapted to rest upon a metal table 27 having supports 28 depending therefrom and adapted to hold the burner 29 to which fuel is supplied through the pipe 30 controlled by means of the valve 31. By means of this burner the pan, with its contained material, the cylinder and the core are brought to a temperature above the melting point of the solder used, so that the solder which is solidified during the pouring operation may be completely melted and a good bond thus secured. To assist in maintaining the proper heat conditions during the joining operation, the table 27 is provided with supports 32 upon which is placed a cylindrical metal sleeve 33, adapted to cause substantially all the heat from the burner 29 to affect the pan, cylinder, core and soldering material.

The method of joining fins to a cylinder is quite simple. The core having been properly prepared, and the cylinder, preferably, coated the two are placed upon the pan 25, with the lower end thereof sealed by the mixture 26 and the burner 29 is started. Molten solder is then poured into the space between the cylinder and the core. Some of the solder will solidify but the heat from the burner soon brings the entire apparatus up to a temperature which will insure melting of all the solder. The solder will then run down into the space between the cylinder and core, and a good bonding of the fins and the cylinder will result. The apparatus is then allowed to cool down, the solder to set, and the sand then cleaned from the fins.

It is not necessary that the cylinder and core be placed upon the pan 25 and the soldering material poured therebetween. If desired the cylinder and core may be clamped in properly spaced relation and immersed in a bath of soldering material. Where this method of bonding is used, however, care must be taken to prevent the solder running out from between the cylinder and core when the apparatus is removed from the bath of solder.

While the method herein described, constitutes a preferred embodiment of the invention, it is to be understood that the invention is not limited to this precise method, and that changes may be made without departing from the scope of the invention which is defined in the appended claims.

What I claim is as follows:

1. The method of joining fins to an engine cylinder which consists in forming a core containing said fins, and having the inner ends of the fins unprotected; placing the cylinder within the core and in properly spaced relation to the unprotected ends of the fins; damming the lower end of the space between the cylinder and core to prevent the flow of molten soldering material therethrough; and pouring molten soldering material within said space.

2. The method of joining fins to a cylinder which consists in forming a core containing said fins, arranged in properly spaced relation, and having the inner ends thereof unprotected; coating the cylinder, to which the fins are to be joined, with soldering material; placing the cylinder within the core and in properly spaced relation thereto; damming the lower end of the space between the cylinder and core to prevent the flow of soldering material therefrom; and pouring soldering material into the space between the cylinder and core, and about the unprotected ends of the fins.

3. The method of joining copper cooling fins to an engine cylinder composed of a wear resisting metal which consists in assembling the fins within a core with the inner ends thereof unprotected; coating the cylinder with a material adapted to facilitate the bonding of the soldering material to said cylinder; placing the coated cylinder within the core and in properly spaced relation to the unprotected inner ends of the fins; running soldering material into said space while at the same time preventing the escape of the molten soldering material from said space; and heating the soldering material, the cylinder, and the fins to a temperature adapted to cause a free flow of the soldering material within said space.

In testimony whereof I affix my signature.

THOMAS MIDGLEY, Jr.

Witnesses:
MILDRED PEARE,
ALVINA LEHMAN.